United States Patent
Ascher

(10) Patent No.: US 9,085,094 B2
(45) Date of Patent: Jul. 21, 2015

(54) METHOD OF MAKING A FOLDING VEHICLE TOP

(75) Inventor: Andreas Ascher, Neureichenau (DE)

(73) Assignee: PARAT BETEILIGUNGS GMBH, Neureichenau (DE)

( * ) Notice: Subject to any disclaimer, the term of this patent is extended or adjusted under 35 U.S.C. 154(b) by 0 days.

(21) Appl. No.: 13/480,736

(22) Filed: May 25, 2012

(65) Prior Publication Data

US 2013/0038083 A1    Feb. 14, 2013

(30) Foreign Application Priority Data

May 25, 2011  (DE) .......................... 10 2011 103 153
Dec. 14, 2011  (DE) .......................... 10 2011 120 953

(51) Int. Cl.
| | |
|---|---|
| *B29C 39/10* | (2006.01) |
| *B29C 33/50* | (2006.01) |
| *B29C 39/00* | (2006.01) |
| *B29C 39/34* | (2006.01) |
| *B60J 1/18* | (2006.01) |
| *B29L 31/30* | (2006.01) |

(52) U.S. Cl.
CPC .................. *B29C 39/10* (2013.01); *B29C 33/50* (2013.01); *B29C 39/006* (2013.01); *B29C 39/34* (2013.01); *B60J 1/1815* (2013.01); *B29K 2875/00* (2013.01); *B29L 2031/30* (2013.01)

(58) Field of Classification Search
CPC .............. B60J 1/1815; B29L 2031/30; B29K 2875/00; B29C 39/34; B29C 39/50; B29C 39/10; B29C 33/50

USPC ...................................................... 296/107.08
See application file for complete search history.

(56) References Cited

U.S. PATENT DOCUMENTS

| | | | |
|---|---|---|---|
| 4,755,339 A * | 7/1988 | Reilly et al. ................... | 425/543 |
| 6,099,779 A | 8/2000 | Brandner et al. | |
| 6,152,518 A | 11/2000 | Schoenenbach | |
| 6,170,901 B1 | 1/2001 | Hartmann | |
| 8,398,146 B2 * | 3/2013 | Just et al. ................ | 296/107.07 |
| 2012/0045272 A1 | 2/2012 | Just et al. | |

FOREIGN PATENT DOCUMENTS

DE         202006017746 U    2/2007

* cited by examiner

*Primary Examiner* — Glenn Dayoan
*Assistant Examiner* — Melissa A Black
(74) *Attorney, Agent, or Firm* — Andrew Wilford

(57) ABSTRACT

A folding top for vehicles has a cast-resin bead element provided in a connecting region between an outer cover surface element and at least one further cover element. The top is made by first inserting at least one section of the outer cover surface element into a casting mold and at least one section of a sacrificial profile into the casting mold. A head area of the profile is wider than a neck area thereof. Then a casting compound is introduced into the casting mold around the head area. After curing of the compound, the cover surface element is removed with bead element affixed thereto from the casting mold. The sacrificial profile is extracted from the bead element in order to provide an undercut seat in the bead element.

13 Claims, 6 Drawing Sheets

METHOD OF MAKING A FOLDING VEHICLE TOP

FIELD OF THE INVENTION

The invention relates to a method of making a folding top for vehicles, the folding top having a cast-resin bead element in particular made of polyurethane (PUR) and provided in a connecting region between an outer cover surface element and at least one further cover element.

BACKGROUND OF THE INVENTION

Various methods for making folding vehicle tops are known and widely used. A folding top and a manufacturing method therefor are described in EP 0 884 207 [U.S. Pat. No. 6,170,901] by the present applicant. For a vehicle soft top, it is known from the cited document to connect a first cover surface element to another structural element by a polyurethane (PUR) element. According to this publication, the PUR element may connect two cover surface elements to another, a cover surface element to a rear window, a cover surface element to a rod assembly part, or a cover surface element to a roof drip rail.

Furthermore, a folding top for a vehicle is known from EP 1 033 270 [U.S. Pat. No. 6,152,518] by the present applicant, in which a cast-resin bead element connects an outer soft top cover to a glass panel. In addition, a plug-in seat is provided inside the bead element that allows connection of the bead element to a roof liner, i.e. the inner soft top cover, by plug-in connection elements.

A refinement of this folding top is described in DE 20 2006 017 746 U1, likewise by the present applicant. This publication also describes a cast-resin profile having a plug-in seat for the mounting the roof liner.

The latter two publications describe the option of providing an undercut seat in a cast-resin bead element. The publications do not describe the manner in which the undercut seat is produced in the cast-resin bead element.

In practice, in recent years this has basically been carried out in the present applicant's manufacturing facilities in such a way that the casting mold, as a mold component, has a male profile with a head area and a neck area, the head area being wider than the neck area.

After the casting compound has cured, the cast-resin bead element thus formed was removed from the mold. In this regard, for the fixedly held casting mold, forced demolding from the male profile took place. A female profile that is complementary to the male profile was formed in the bead element. This female profile formed a seat groove.

OBJECT OF THE INVENTION

Based on the described method of making a folding vehicle top according to the prior art, the object of the invention is to provide an improved method that allows reliably controllable manufacture.

SUMMARY OF THE INVENTION

This object is achieved by the invention in a method whose goal is to manufacture a folding vehicle top having in the finished state a cast-resin bead element that in particular is made of polyurethane (PUR). In the installed state, the cast-resin bead element is provided in a connecting region between an outer cover surface element and at least one further cover element. For example, the cast-resin bead element may be provided between an outer soft top cover and a glass panel, and may mechanically connect these two elements of the folding top to one another in a secure and seal-tight manner.

In addition, in the finished manufactured state of the folding top the cast-resin bead element has an undercut seat, for example an undercut seat groove, that is provided in the bead element. A plug-in connector strip to which the roof liner is fastened, for example stitched or glued, may be inserted into this groove.

Alternatively, however, in the method according to the invention the cast-resin bead element may be provided in a connecting region between an outer cover surface element and a structural element of the soft top, for example a rod assembly element, a drip rail, or a second cover surface element.

SUMMARY OF THE INVENTION

The method according to the invention provides, first of all, that at least one section of the outer cover surface element, advantageously the entire edge region of the outer cover surface element that surrounds a cutout in the outer cover surface element, is introduced, in particular inserted, into a casting mold.

In addition, a section of a sacrificial profile is introduced into the casting mold. The entire sacrificial profile, preferably also extending circumferentially along the entire edge of the glass panel, is advantageously introduced into the casting mold. The sacrificial profile may, for example, be an existing profile made of a relatively soft material such as silicone that is used solely for forming the undercut seat, i.e. the undercut seat groove in the bead element, for example. As soon as the seat is formed, this profile is sacrificed; i.e. it is no longer needed and may be disposed of. Solely for the sake of completeness, it is mentioned that in one embodiment the sacrificial profile may also be used multiple times, i.e. may be used during the manufacture of different connecting regions.

After the PUR casting compound has cured, the sacrificial profile is detached from the bead element thus formed. A seat, for example a continuous grooved seat, is provided in the bead element as a result of removing the sacrificial profile from the bead element.

The sacrificial profile has at least one neck area and one head area. The head area is wider than the neck area. After the bead element cures, this head area subsequently forms the holding space in which widened connecting regions of a plug-in connector strip that engage behind holding surfaces in the holding space are accommodated.

In the method according to the invention, after the cover surface element, optionally a further cover element, and the sacrificial profile are inserted, a casting compound is introduced into the casting mold. The casting compound spreads in the casting mold in such a way that at least the head area of the sacrificial profile is enclosed by the casting compound. The casting compound is then allowed to cure in that the casting compound is left in the casting mold until it is removable from the casting mold without a significant change in shape of the bead element that is formed in this way. This consideration is important due to the fact that the cast-resin bead element is never completely hard, even when the prescribed drying time is reached, and as a rule may have a certain, albeit slight, flexibility.

The cover surface element together with the cured bead element affixed thereto, as well as the further cover element optionally affixed thereto, may subsequently be removed from the casting mold. Lastly, the sacrificial profile is extracted from the bead element. An undercut seat may thus be provided in the bead element.

The extraction of the sacrificial profile from the bead element is very simple, and may be carried out without great effort. This is possible because the material of which the sacrificial profile is made is selected in such a way that it is softer than the material of the cured bead element. In this regard, the sacrificial profile is compressible or flexible at least to a certain degree, so that the widened head area of the sacrificial profile is able to pass through the narrow neck area in the bead element.

In this respect, the manufacturing method is much simpler than in the prior art. The method ensures a high level of process reliability, since reliable demolding capability and provision of a seat groove in the bead element are achieved due to the selection of the relatively different material properties of the material of the sacrificial profile and the material of the cured bead element.

The method according to the invention allows an undercut seat to be provided in the cast-resin bead element without causing problems associated with removing the cured cast-resin bead element from the mold. In the method of the prior art, releasing the cover surface element with the cast resin bead affixed thereto from the casting mold was possible only with great difficulty, since the male profile that was enveloped by the casting compound was a component of the mold and was made of a correspondingly hard material, namely, metal as a rule. Although the polyurethane material of the cured casting compound is flexible and compressible to a certain degree, so that the polyurethane bead element was forcibly demolded from the casting mold with great effort, with regard to manufacturing tolerances as well as the desired undercuts it sometimes required considerable effort to demold the cured cast-resin bead element, if at all.

Lastly, specifically because of the difficult forced demolding, in the prior art it was not possible to provide a completely circumferential seat groove; rather, undercut seats could be provided in the cast-resin bead element only in partial areas.

According to one advantageous embodiment of the invention, the sacrificial profile has a uniform cross section over its entire axial length. The head area thus has a continuous design. This advantageous embodiment of the invention allows manufacture of a folding top in which a seat groove that completely surrounds the edge of a glass panel is present in the bead element. Mounting a roof liner on the bead element may thus be greatly simplified. In addition, forces that occur while fastening the roof liner to the bead element may thus be distributed in an optimal manner. Point loading in the connecting region between the roof liner and the bead element is thus avoided. This is particularly advantageous when the method is used to manufacture a folding top that has a connecting region in which the cast-resin bead element connects an outer cover surface element to a glass panel, and in addition a seat groove for fastening a plug-in connector strip of a roof liner is provided in the bead element.

According to another advantageous embodiment of the invention, the sacrificial profile is an extruded profile. This allows the method according to the invention to be carried out in a particularly cost-effective manner.

According to an alternative embodiment of the invention, the sacrificial profile has multiple head areas, separated at a spacing from one another, distributed over its axial length. In this case, although the sacrificial profile itself has a continuous design, only discrete head areas, i.e. that are separate or spaced apart from one another, are provided that produce mutually spaced undercut seats in the cured cast-resin bead element.

According to another feature of the invention, the sacrificial profile has a head area, but not necessarily a neck area that is narrower than the head area. For example, the sacrificial profile may have an essentially rectangular cross section. In such a method, bead elements may be produced according to the invention as illustrated in cross section in FIG. 10. These bead elements have a seat groove 17 that is essentially free of undercuts. With regard to the present invention, however, the above statements apply in a substantially similar manner when appropriately evaluated by a person skilled in the art.

In this case, the distinctive feature is that the bead element has a seat groove having undercuts, the seat groove having a continuous design and extending along the entire edge of a glass panel. The seat groove has a uniform or essentially uniform cross section.

As a result of the seat groove having a continuous design and having undercuts along its entire cross section, installation of a roof liner with the assistance of an appropriate plug-in connector, such as a plug-in connector strip according to FIG. 9, may be performed in a particularly time-saving manner. In particular, providing a seat groove, that extends in the axial direction, i.e. in the peripheral direction, and has a uniform cross section, with undercuts offers the option to compensate for tolerances due to the fact that the plug-like attachments, which are fixed on the roof liner side and used for fastening the roof liner to the bead elements, are pushed along the seat groove in the axial direction, or may be mounted at freely selectable axial positions.

In this case, although the bead element has a continuous design and extends circumferentially along the entire edge of a glass panel, the seat groove provided in the bead element has an interrupted design, so to speak. Thus, multiple axial sections of an undercut seat groove are provided, each having a very large axial extension, and in particular, much larger than in the prior art. In the prior art it was known only to provide held undercut seat openings that were very short axially, that cannot be described as seat grooves. However, their axial extension was much smaller than 15 mm, being only 3 or 5 mm, for example.

SPECIFIC DESCRIPTION OF THE INVENTION

Figure 1:
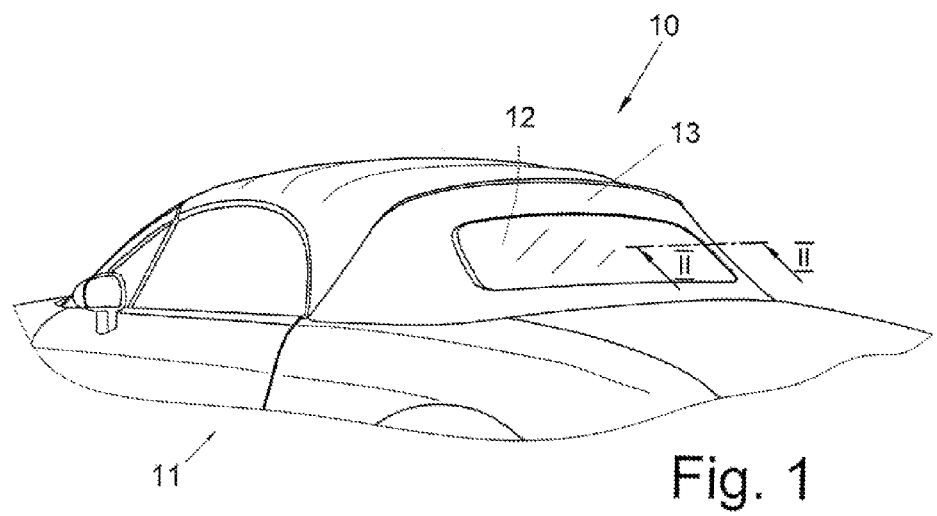
FIG. 1 shows a schematic, in particular not to scale, perspective cut-off rear view of a motor vehicle having a soft top.

One embodiment of a method according to the invention is explained below with reference to the drawings.

The folding top as a whole is denoted by reference numeral 10 in the figures for the sake of simplicity. For the sake of clarity, identical or comparable parts or elements, also insofar as they are associated with different embodiments, are denoted in the following figures by the same reference numerals, sometimes with addition of lowercase letters.

Figure 2:
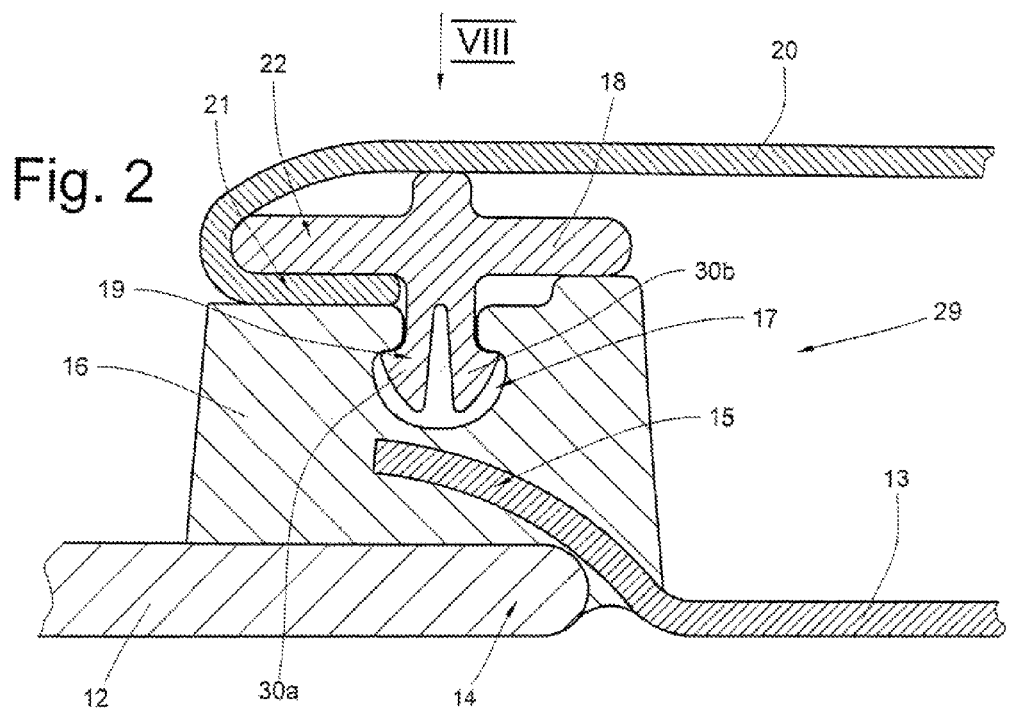
FIG. 2 shows a schematic, cut-off sectional illustration of a cross section of the connecting region between a glass panel, outer soft top fabric, and roof liner, approximately according to section line II-II in FIG. 1.

FIG. 1 shows one embodiment of a folding top 10 manufactured by a method according to the invention, with reference to a motor vehicle 11 that is illustrated only partially. The folding top 10 according to the invention may have an outer soft top fabric 13 and an inner soft top fabric 20, a so-called roof liner. A glass panel 12 is provided in the folding top 10 at the rear side. According to FIG. 2, the soft top 10 manufactured by the method according to the invention has a connecting region 29 that is described with reference to FIG. 2 as follows:

FIG. 2 shows a sectional view of the outer glass panel 12, the outer edge of which is indicated at 14. The glass panel 12 is provided in a cutout in the outer soft top cover 13, in particular in such a way that a circumferential edge 15 of the outer soft top fabric 13 that surrounds the cutout in the outer soft top fabric at least slightly overlaps the edge 14 of the glass panel as viewed in cross section in FIG. 2. The edge 15 of the outer soft top fabric 13 and the edge 14 of the glass panel are mechanically connected to one another in a secure and seal-tight manner via a cast-resin bead element 16 made of polyurethane, for example.

A groove or seat 17 is provided in the cast-resin bead element 16 on the side facing toward the vehicle interior. The seat 17 has an inner widened section. In other words, the seat 17 is provided with undercuts.

According to FIG. 2, in the completely installed state of the folding top 10 a plug-in formation 19 of a plug-in connector strip 18 may engage in the seat 17. The plug-in connector strip 18 is connected to the roof liner 20. For this purpose, for example an edge region 21 of the roof liner 20 is wrapped around a web 22 of the strip 18 and connected to the web 22 via a seam or an adhesive bond, for example. Alternatively, plug-in connector strips (not illustrated) that are sewn into a border of the roof liner may be used.

The plug-in connector strip 18 and the roof liner 20 are preassembled. The plug-in connector strip 18 together with the plug-in formation 19 is inserted into the seat 17 in order to fasten the roof liner 20 to the bead element 16. The two spring tabs 30a and 30b of the plug-in formation 19 may be elastically deflected radially inward, and as soon as the spring tabs 30a and 30b have passed the narrow neck area of the seat 17 they are able to radially expand and engage behind the holding surfaces of the seat 17, as shown in FIG. 2, and ensure a secure hold of the plug-in connector strip 18 to the bead element 16.

Figure 3:
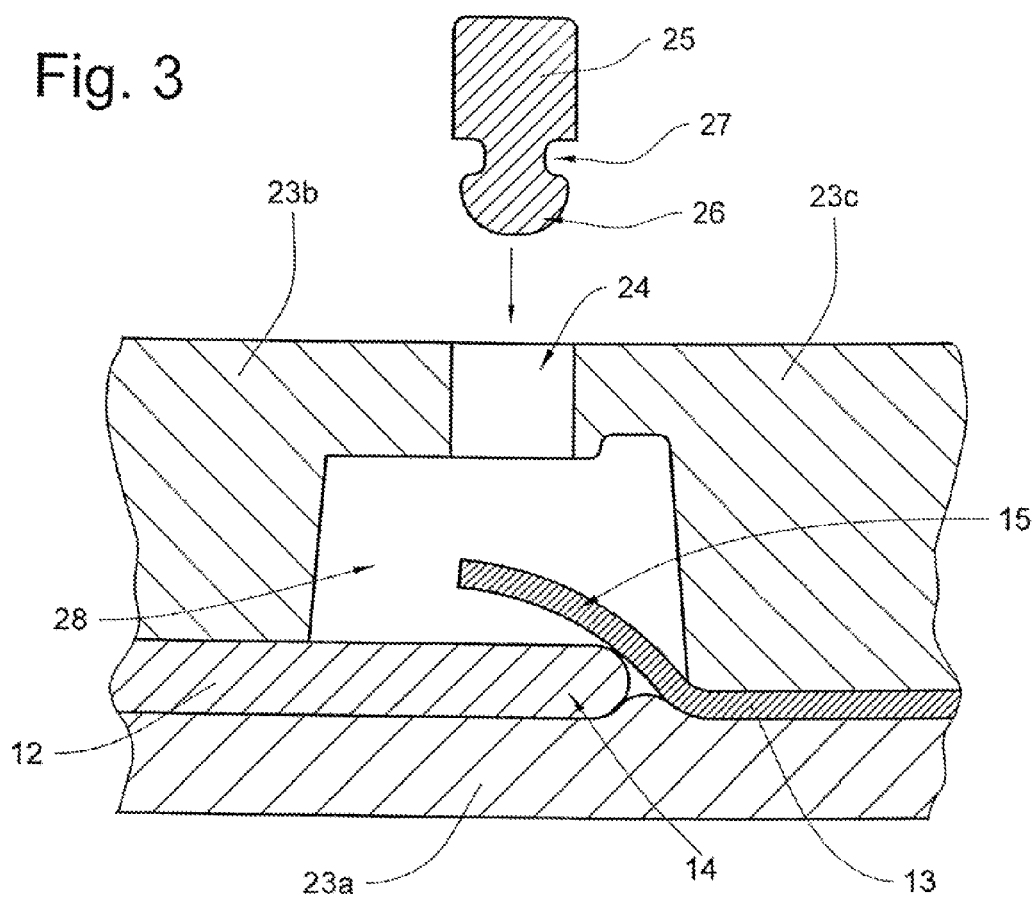
FIG. 3 shows a schematic cut-off sectional illustration of one embodiment of a casting mold, having an edge of a glass panel inserted into the casting mold, an outer soft top cover inserted into the casting mold, and a sacrificial profile that has not yet been inserted into the mold.

The manner in which the connecting region 29 according to FIG. 2 may be produced in a method according to the present invention for making a folding top 10 is described below:

According to FIG. 3, preferably the entire glass panel 12 and the entire soft top fabric edge 15 that surrounds the cutout in the outer soft top fabric 13 are inserted into a casting mold. Due to the sectional view in FIG. 3, only the edge 14 of the glass panel and the soft top fabric edge 15 are shown.

The casting mold is merely indicated in FIG. 3, and is formed by parts 23a, 23b, 23c. The casting mold is advantageously closed on all sides, but is at least designed in such a way that the casting compound cannot accidentally escape after it has been filled.

FIG. 3 shows in a highly schematic manner a casting mold base 23a into which the glass panel 12 and the soft top fabric edge 15 may be inserted in an overlapping arrangement. In another alternative embodiment of the invention (not illustrated), an outer cover surface element is connected not to a glass panel 12, but, rather, to another cover element, for example a rod assembly part, or to a roof drip rail, or to another cover surface element, this other cover element being inserted together with the first cover surface element into the casting mold. However, these other variants are not illustrated in the drawings.

According to FIG. 3, the casting mold parts 23b and 23c cover the casting mold except for an opening 24 at the top. A sacrificial profile 25, indicated in FIG. 3, made of silicone or some other suitable soft material may be inserted into the opening 24. The sacrificial profile has a narrow neck 27 and a widened head section or area 26.

The cavity 28 in the casting mold 23 that is subsequently used for accommodating casting compound is advantageously dimensioned in such a way that it extends circumferentially along the entire outer edge 14 of the glass panel.

Figure 4:
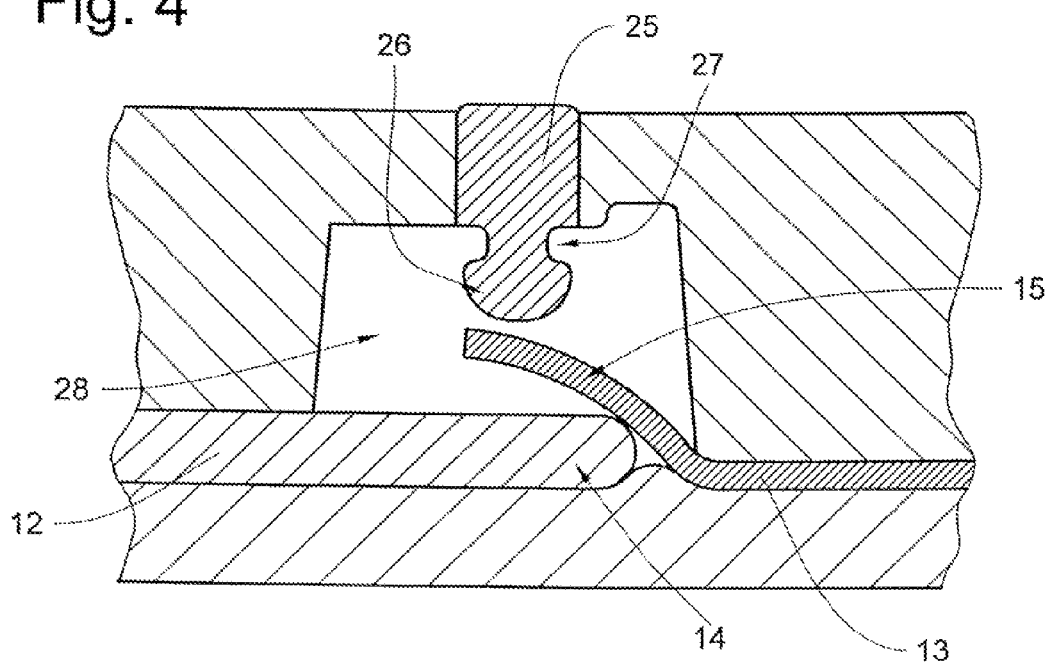
FIG. 4 shows, in a view like FIG. 3, the mold with an inserted sacrificial profile.
Figure 5:
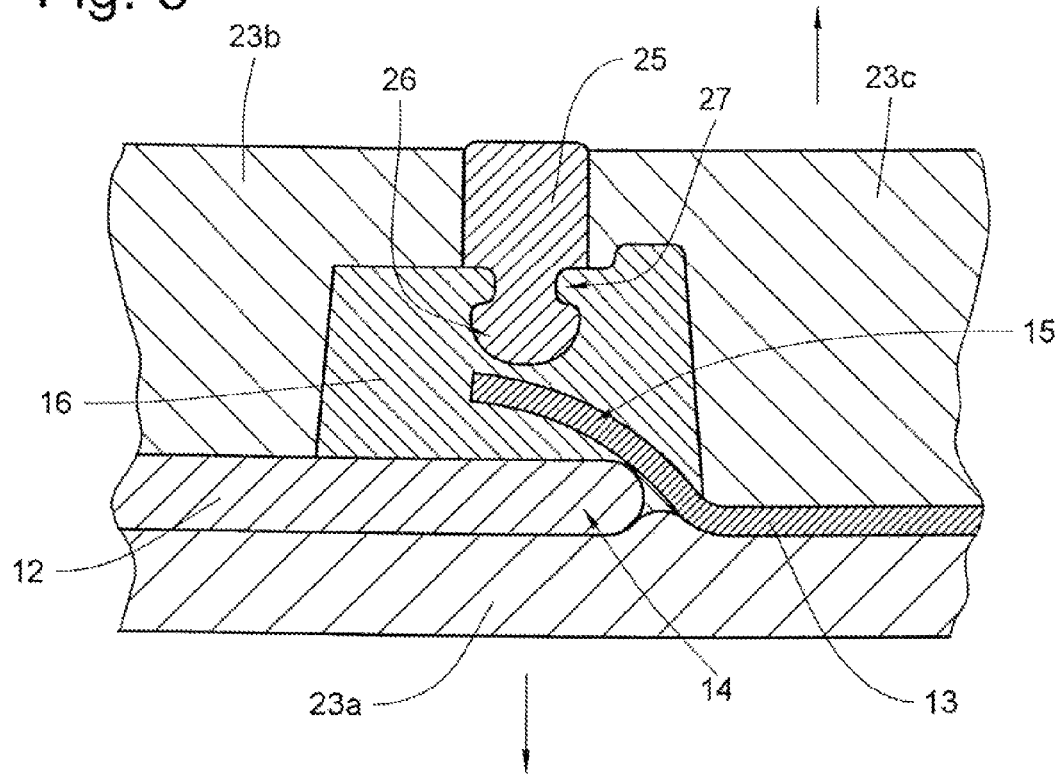
FIG. 5 shows, in a view like FIG. 4, the connecting region after introduction of the casting compound.
Figure 6:
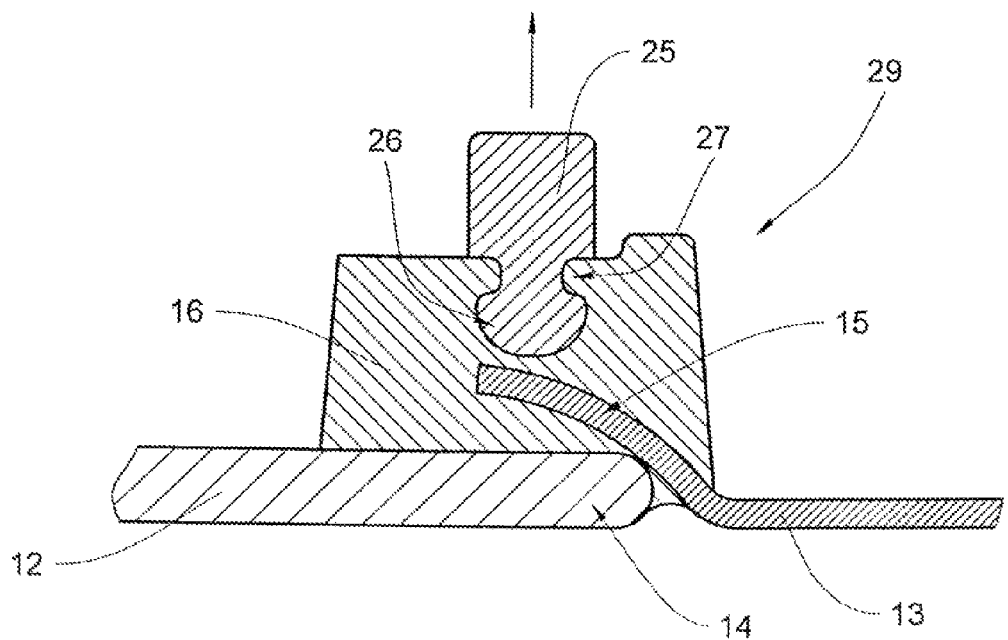
FIG. 6 shows, in a view like FIG. 5, the connecting region after removal of the connecting region from the casting mold.

FIG. 4 shows that the sacrificial profile 25 may be inserted into the opening in such a way that the casting mold is completely closed off after the insertion. The cavity 28 may be subsequently filled with casting compound 16. This state is shown in FIG. 5. After the casting compound has cured, the connecting region 29 is extracted from the casting mold. For this purpose, the mold may be partially opened, and the connecting region removed. FIG. 6 shows the connecting region 29 that has been demolded, i.e. removed from the casting mold, in this manner. The head area 26 of the sacrificial profile 25 is still engaged in the bead element 16. The sacrificial profile 25 is then removed from the bead element 16, and for this purpose its head area 26 is extracted from the seat 17 by brief radial compression of the head area 26. This compression is easily performed on account of a suitable material for the sacrificial profile.

Figure 7:
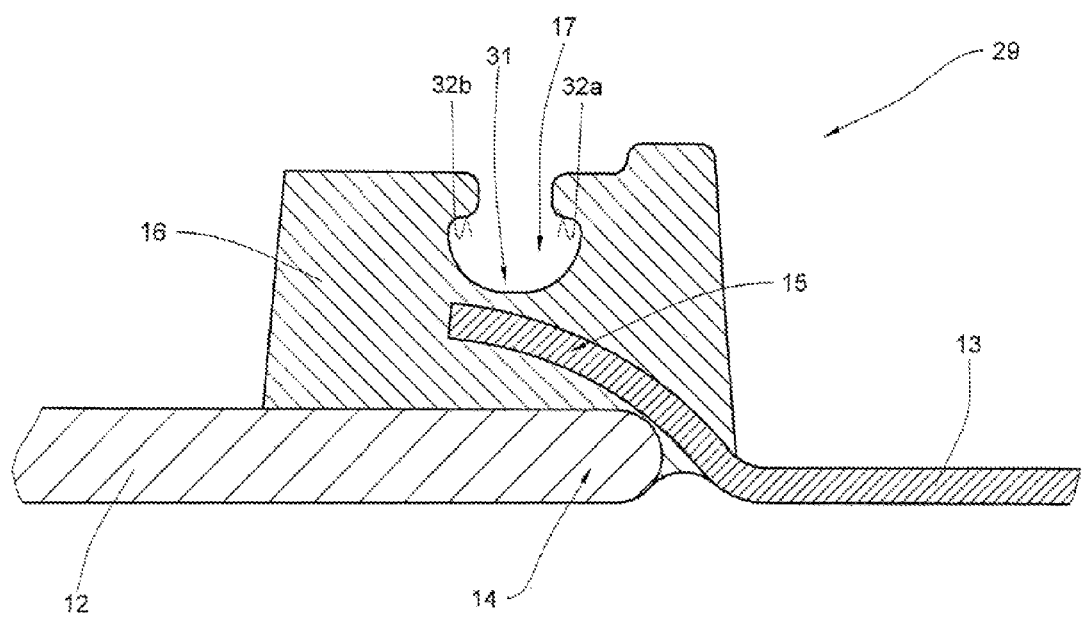
FIG. 7 shows the connecting region according to FIG. 6 after removal of the sacrificial profile from the bead element.

FIG. 7 shows the connecting region 29 after demolding of the sacrificial profile. A continuous groove 17 having a widened base 31 remains.

As previously described with reference to FIG. 2, the seat 17 thus formed may be used for accommodating a plug-in connector strip 18 for purposes of fastening a roof liner 20 to the bead element 16.

Figure 8:
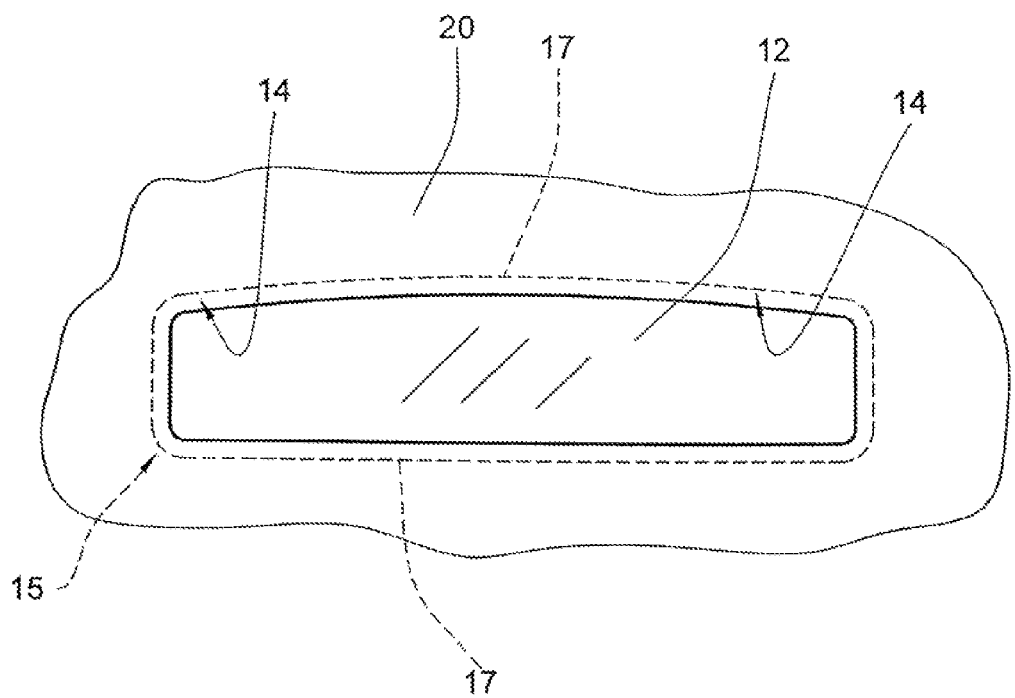
FIG. 8 shows, in a schematic interior view, a sectional view of the soft top region around the glass panel, with a continuous seat groove indicated by a dashed line.

According to the schematic illustration in FIG. 8, the groove or holding space 17 may have a continuous circumferential design, i.e. extending along the entire edge 14 of the glass panel, or may extend at least along a significant portion of the periphery of the edge 14 of the glass panel.

Figure 9:
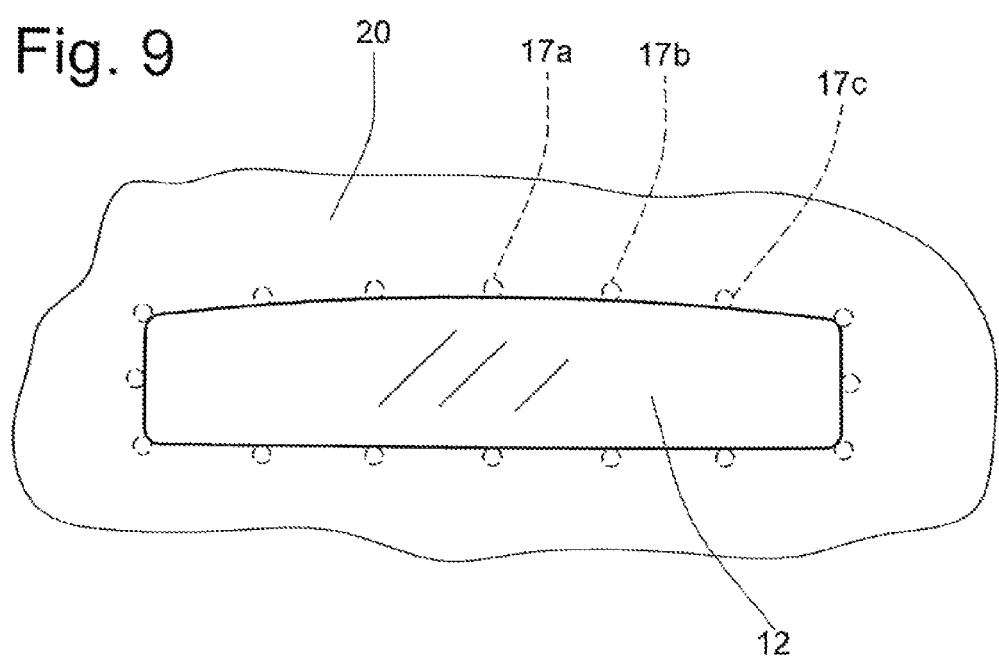
FIG. 9 shows another embodiment in a view like FIG. 8, having multiple plug-in seats provided at a spacing from one another.

As an alternative, FIG. 9 shows that undercut seats 17a, 17b, 17c that are separated at a spacing from one another may be provided in the bead element by selecting an alternative geometry of a sacrificial profile. This allows a plug-in connector strip 18 to be fastened to the bead element 16 only at specific points. For producing suitable sacrificial profiles having undercut seats 17a, 17b, 17c that are separated at a spacing from one another, the sacrificial profiles have a variable cross section along their axial extension. Such sacrificial profiles are not likely to be producible as extruded profiles. However, sacrificial profiles that are suitable for this purpose may be designed as plastic injection molded parts, for example.

Suitable sacrificial profiles may have, for example, a shared base section that has narrow necks and widened head sections provided thereon only at individual locations.

Alternatively, individual plug-like or mushroom head-like sacrificial profiles may be provided for forming individual seats 17a, 17b, 17c.

Any suitable cross-sectional shape of the seats may be achieved using the method according to the invention. The embodiment schematically illustrated in FIG. 7 may also be modified.

It is crucial that the seat 17 to be formed in the bead element with the aid of a sacrificial profile 25 has a widened base 31 that provides, at least on one side, holding surfaces 32a and 32b at which complementary plug-in formations 19 may take hold.

In addition, the illustrated mold is understood to be only schematically shown, and may be modified as desired. For example, the sacrificial profile 25 may also be inserted into a closed casting mold that thus has no separately provided opening 24 for insertion of a sacrificial profile 25, and is optionally also fixed in position therein before introduction of the casting compound. Last, for example, a configuration of the casting mold that is geometrically inverted compared to the illustration in the drawings is possible, in which the casting mold base according to FIG. 3 is provided at the top.

Figure 10:
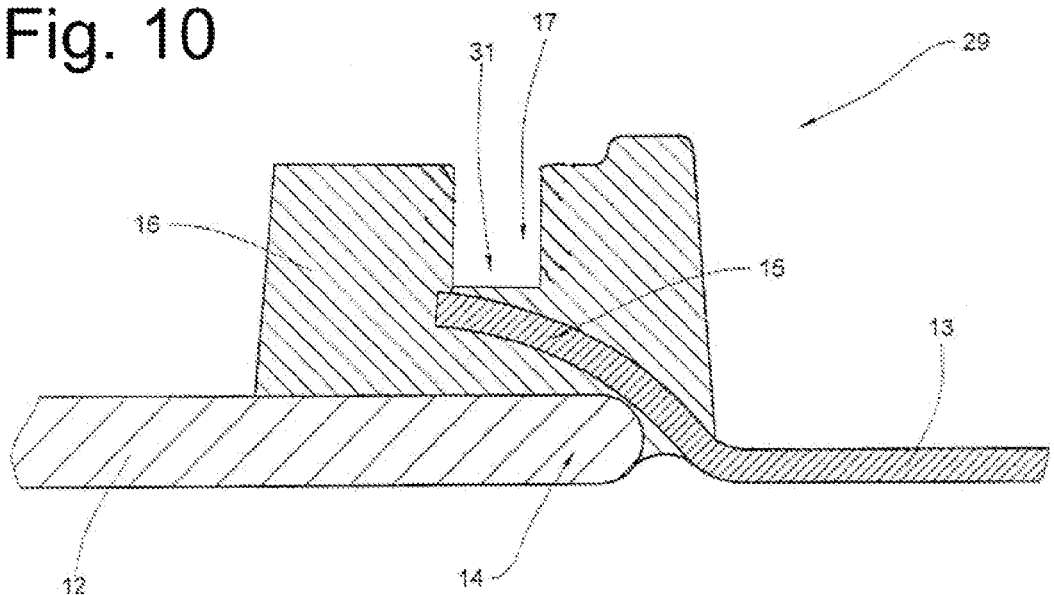
FIG. 10 shows another embodiment of a connecting region according to the invention, in a view like FIG. 7, in the present case a bead element having been made by a method according to the invention.

FIG. 10 schematically shows another embodiment of a connecting region designed according to the invention that has been produced using the method according to the invention. In this case, the seat groove 17 is provided with an essentially rectangular cross section that is free of undercuts. To produce this seat groove 17, a sacrificial profile (not illustrated) has been used that has a head section having a cross section that also has a complementary design.

The seat groove 17 is used for receiving a complementary plug-in connector, for example a plug-in connector strip (not illustrated), which may have a similar design to the plug-in ribs indicated at 19 in FIG. 2, the cross section of the plug-in ribs being appropriately adapted in order to establish a plug-in connection with a bead element according to FIG. 10. Suitable clamping mechanisms may be used here. For example, metal clamping elements that are able to hold tightly to the walls of the seat groove 17 and that are able to accommodate a plug-in formation of a connector element of the roof liner may also be inserted into the seat groove 17 according to FIG. 10, which shows a cross section free of undercuts.

Figure 11:
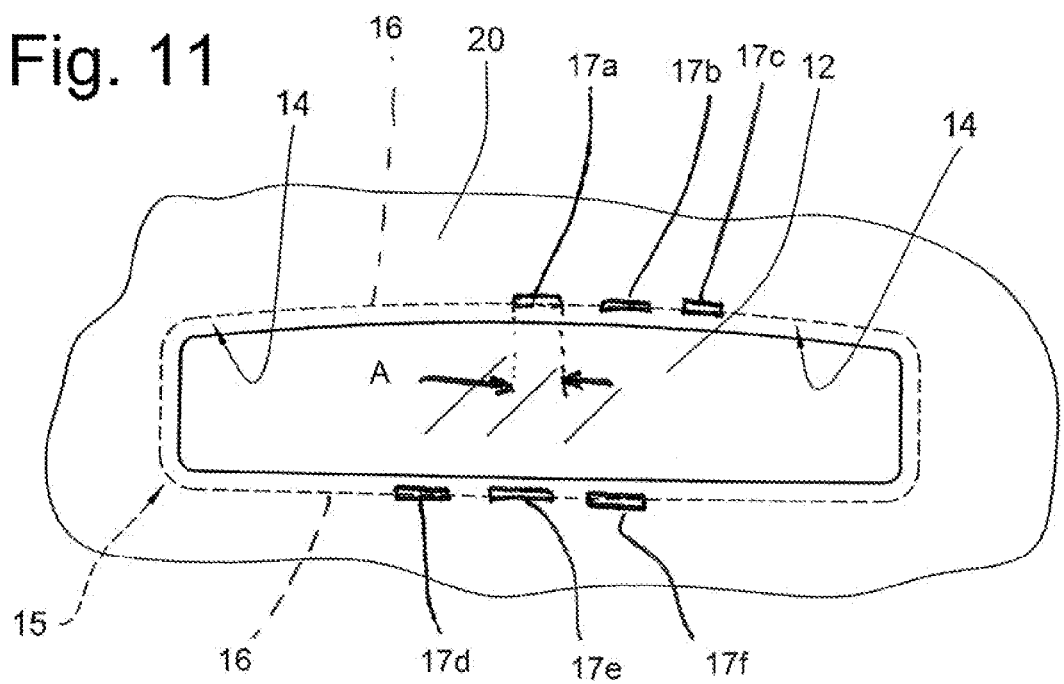
FIG. 11 shows one embodiment of a folding top according to the invention in a view like FIG. 8, in this case the invention according to the invention being implemented.

Last, FIG. 11 shows another embodiment of a folding top according to the invention, once again only the cutout around the rear window 12 being illustrated.

FIG. 11 indicates that a cast-resin bead element 16 continuously extends circumferentially around the glass panel 12 in the peripheral direction. This is illustrated by the dashed line.

Multiple segments of a seat groove are provided in the peripheral direction, i.e. relative to the bead element 16 in the axial direction thereof. These segments are illustrated solely by way of example, and are indicated at 17a, 17b, 17c and 17d, 17e, 17f. In the folding top according to the invention according to FIG. 11, the axial dimension A of such a seat groove 17a is greater than 15 mm, preferably greater than 20 mm, more preferably greater than 25 mm, more preferably greater than 30 mm, more preferably greater than 35 mm, and lastly, more preferably greater than 35 mm, and lastly, more preferably greater than 40 or 45 mm.

As a result of the segments of seat grooves 17a, 17b, 17c, 17d, 17e, 17f having very long axial extensions, the option is provided for compensating for tolerances in the fastening of plug-in ribs 19. These plug-in ribs may be fixed in the axial direction at freely selectable positions. The installation of a roof liner may thus be greatly simplified.

The invention claimed is:

1. A method of making a folding top for vehicles, the method comprising the following steps:
   a) inserting at least one section of an outer cover surface element into a cavity of a casting mold,
   b) inserting into the cavity of the casting mold at least one section of a sacrificial profile having a head and a neck, the head being wider than the neck,
   c) introducing a casting compound into the cavity of the casting mold such that at least the head is enclosed by the casting compound and the casting compound engages the one section of the outer cover surface element,
   d) curing the casting compound so as to form on the one section of the outer cover surface element a bead element in which at least the head is embedded,
   e) removing the cover surface element, the bead element affixed thereto, and the sacrificial profile from the casting mold, and
   f) extracting the sacrificial profile from the bead element in order to form an undercut seat in the bead element.

2. The method according to claim 1, wherein the sacrificial profile is made of a material that is softer or more compressible or more flexible than the cured bead element.

3. The method according to claim 1, wherein the sacrificial profile is made of silicone or contains silicone.

4. The method according to claim 1, wherein the sacrificial profile has a uniform cross section over its entire axial length, so that the head has a continuous design.

5. The method according to claim 4, wherein the sacrificial profile is an extruded profile.

6. The method according to claim 1, wherein the sacrificial profile is elongated and has multiple heads separated at a spacing from one another and distributed over its length.

7. The method according to claim 1, wherein the method also includes the following step prior to step c):
   a2) inserting at least one section of a further cover element into the casting mold.

8. The method according to claim 1, wherein the method also includes the following step after step f):
   g) inserting into the seat a plug-in connector strip to which a roof liner is fastened.

9. A folding top for vehicles that is manufactured by a method according to claim 1.

10. A method of making a folding top for vehicles, the folding top having a cast-resin bead element provided in a connecting region between an outer cover surface element and at least one further cover element, the method comprising the following steps:
   h) inserting at least one section of the outer cover surface element into a cavity of a casting mold,
   i) inserting into the cavity of the casting mold at least one section of a sacrificial profile having a head and made of a material that is softer or more compressible or more flexible than that of the bead element when cured,
   j) introducing a casting compound into the cavity of the casting mold so as to enclose at least the head and to engage the casting compound with the one section of the outer cover surface element, k) allowing the casting compound to cure and form the bead element, l) removing the outer cover surface element, the bead element affixed thereto and the sacrificial profile from the casting mold, and m) extracting the sacrificial profile from the bead element in order to leave a seat in the bead element.

11. A folding top for vehicles, the folding top having a cast-resin bead element that is provided in a connecting region between an outer cover surface element and an edge region of a vehicle glass panel, the bead element being formed with an elongated undercut seat groove that extends along an edge region of a vehicle glass panel in order to surround the entire vehicle glass panel.

12. A folding top for vehicles, the folding top having a cast-resin bead element that is provided in an axially extending connecting region between an outer cover surface element and an edge region of a vehicle glass panel, the bead element having a continuous design along its axial direction, and extending along the edge region of the vehicle glass panel in order to surround the entire vehicle glass panel or at least essentially surround the entire vehicle glass panel, wherein at least one axially extending undercut seat groove is provided in the bead element that has an axial extension that is greater than 15 mm.

13. The method defined in claim 1, wherein the sacrificial profile has a part connected via the neck to the head and the part is positioned at least partially outside a cavity of the casting mold in step b) such that after step e) the part is exposed on or projects from a surface of the bead.

* * * * *